United States Patent [19]
Wolfbauer

[11] Patent Number: 5,092,546
[45] Date of Patent: Mar. 3, 1992

[54] SUPPORT SYSTEM FOR ELECTRICAL CONDUITS AND THE LIKE

[76] Inventor: Douglas A. Wolfbauer, 6133 Oak Ridge Dr., Washington, Mich. 48094

[21] Appl. No.: 693,044

[22] Filed: Apr. 29, 1991

Related U.S. Application Data

[63] Continuation of Ser. No. 517,333, May 1, 1990, abandoned.

[51] Int. Cl.⁵ .............................................. F16L 3/22
[52] U.S. Cl. ..................... 248/49; 211/193; 211/208; 248/68.1; 248/222.2
[58] Field of Search ........................... 248/220.2, 222.2

[56] References Cited

U.S. PATENT DOCUMENTS

| | | |
|---|---|---|
| 1,129,553 | 2/1915 | Cope .............................. 248/68.1 X |
| 3,212,648 | 10/1965 | Baker et al. .......................... 211/193 |
| 3,339,870 | 9/1967 | Damsgaard . |
| 3,371,798 | 3/1968 | D'Altrui .......................... 211/193 X |
| 3,406,932 | 10/1968 | Burke . |
| 3,512,654 | 5/1970 | Olsen et al. .......................... 211/193 |
| 3,689,015 | 9/1972 | Johnson . |
| 3,948,473 | 4/1976 | Mason . |
| 4,076,199 | 2/1978 | Paulsen . |
| 4,181,279 | 1/1980 | Perrault et al. . |
| 4,444,323 | 4/1984 | Travis .............................. 211/208 X |

FOREIGN PATENT DOCUMENTS 992184 5/1965 United Kingdom ................ 248/243

OTHER PUBLICATIONS

"Saddle Rack" manufactured by Underground Devices Inc.
"Heavy Duty Non-Metallic Cable Rack" manufactured by Underground Devices, Inc.
"Non-Metallic, Adjustable Arm Cable Rack" manufactured by Underground Devices, Inc.

*Primary Examiner*—Carl D. Friedman
*Assistant Examiner*—Derek J. Berger
*Attorney, Agent, or Firm*—Gifford, Groh, Sprinkle, Patmore and Anderson

[57] ABSTRACT

A heavy-duty, non-conductive support system for one or more electrical conduits and the like comprises a substantially uprightly positionable support structure and at least one bracket removably interlockable with the support structure. Both elements of the support system are preferably composed of a polymerized, non-conductive material. The bracket includes a conduit receiving portion and an interlocking portion. The interlocking portion includes two spaced apart fingers disposed in a side by side relationship. The support structure includes a central rib having two sides, each of the sides having finger-receiving slots defined therein.

6 Claims, 2 Drawing Sheets

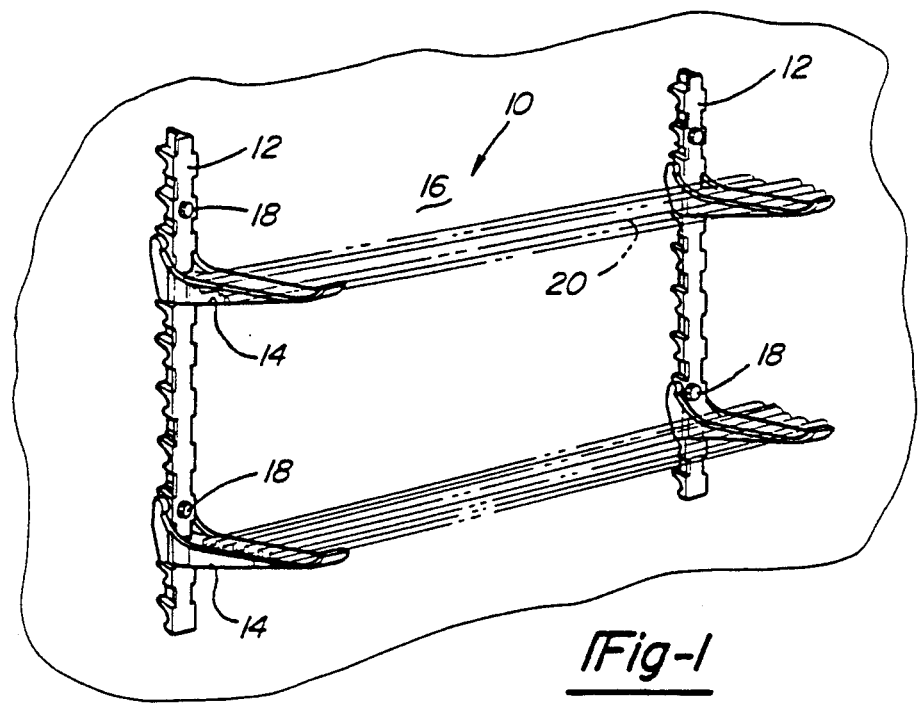
Fig-1
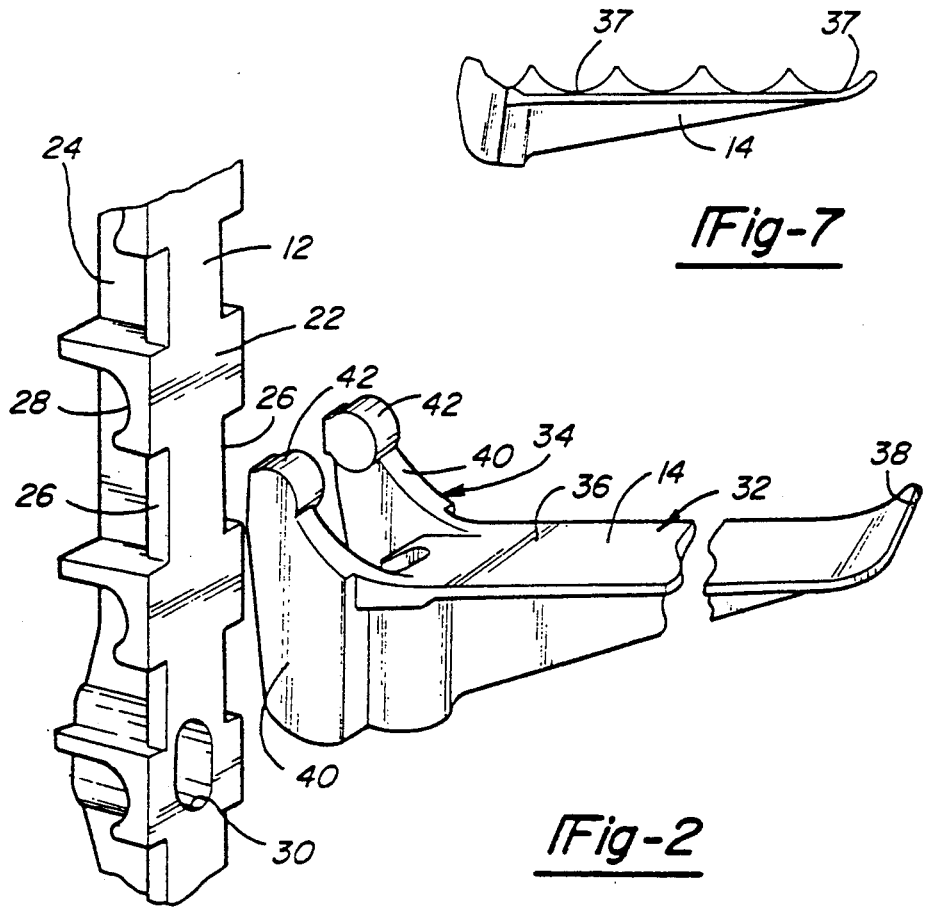
Fig-7
Fig-2

SUPPORT SYSTEM FOR ELECTRICAL CONDUITS AND THE LIKE

This is a continuation of copending application Ser. No. 07/517,333 filed on May 1, 1990, now abandoned.

BACKGROUND OF THE INVENTION

I. Field of the Invention

The present invention relates generally to support systems. More particularly, the present invention relates to a heavy-duty, non-conductive support system for electrical conduits and the like including a substantially vertical support structure and a removably interlockable bracket.

II. Description of the Relevant Art

Support systems for a multitude of purposes have been long known and have incorporated a substantially vertical primary support structure having attached thereto one or more perpendicularly provided support arms or brackets.

Support systems of this general type are known for specialized uses. For example, the use of support systems to support pipe lines in sewers, tunnels and the like is known. In this application, the system is directed at permanent support for such items.

In another application, support systems may be applied for the support of electrical conduits, communication lines and the like. In this particular application, the support system is confronted with many unique and very specific demands.

For example, electrical conduits can have extremely high and extremely dangerous voltages levels, very often being equivalent to or exceeding 100,000 volts. Obviously such high voltage wiring must be insulated whereby the voltage carried by the particular lines is not allowed to leak or be grounded to adjoining surfaces.

In the past when such high voltage electrical conduits have been situated on supports and the like, insulation has been provided through one or more of any of a variety of often impractical solutions.

For example, if the supporting structure was composed of a metal, a ground lead was directed from the support members to a site in communication with the ground. If a short or a break in the high voltage line erupted, the leaked voltage would be carried away toward the earth, as opposed to being passed to the conduit support structure. However, this method is generally unsatisfactory in that the extra steps of providing a ground lead and the extra materials required therefor have proven cumbersome. In addition, metal-type support structures are prone to corrosion, this being an obvious problem which could result in the breakdown of not only the support structure, but also of the electrical conduit system being carried thereby.

An alternate approach is to provide an insulator of either a glass or plastic composite fitted strategically between the electrical conduit line and the frame structure. While eliminating some of the problems and disadvantages commonly associated with the mechanism required for grounding, this system fails to overcome the problem of being cumbersome, in that it requires the addition of insulators and the like either at the manufacturing level of the shelve construction or at the installation level whereby the installer is required to strategically fit insulators between the conduits and the support structure of the frame. In addition, the system also suffers from the susceptibility of the structure to corrosion.

Accordingly, the prior approaches to solving the problems related to provision of a non-conductive support assembly that is both efficient in its performance, economical in its expense and maintenance, and reliable have failed.

SUMMARY OF THE PRESENT INVENTION

The present invention provides a heavy duty non-conductive support system for one or more electrical conduits, communication lines and the like which overcomes the known problems of the present support assemblies.

The support system of the present invention comprises a substantially uprightly positionable support structure and at least one bracket removably interlockable with the support structure. Both elements of the support system are preferably composed of a polymerized, non-conductive material. This material may be a nylon, a polycarbonate, or a similarly non-conductive polymerized material. The bracket includes a conduit receiving portion and an interlocking portion.

The conduit receiving portion of the bracket includes an end lip which prevents the conduit or similar line from slipping or falling therefrom.

The interlocking portion includes two spaced apart finger segments disposed in a side by side relationship. The finger segments are insertable into slots situated on two sides of a central rib of a substantially vertical support structure. The front of the central rib includes an abutment region against which the bracket rests and is held thereto in close contact by the weight of the electrical conduit.

The support system of the present invention by its composition is inherently non-conductive, and provides a significant advantage over the known systems.

The support system of the present invention eliminates the need for insulation and grounding.

Furthermore, the support system of the present invention is advantageous over the known systems in that it is composed of a light weight material, this light weight material being easily cut so that the support structure itself which supports the brackets may be fitted as required into spaces having specific heights.

Furthermore, because the present invention is composed of a relatively inexpensive polymerized material, it may be produced at a relatively low cost and may be shipped and stored with a minimum of inconvenience because of its relatively small weight.

In addition, the support system of the present invention provides a structure which is not only non-conductive, but is also water and chemical resistant, thereby providing maximum utility, convenience and durability at a relatively low cost.

Finally, the support system of the present invention may provide either temporary support or may be permanently installed.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiment of the present invention when read in conjunction with the accompanying drawing, in FIG. 1 is a perspective view illustrating the support system the present invention in a preferred assembly whereby the support brackets are in place on the support structure, and materials such as conduit tubing is situated thereupon;

FIG. 2 discloses a perspective detailed view illustrating the support structure and its associated bracket in a separated position;

FIG. 7 illustrates a side view of an alternate configuration of the bracket.

DETAILED DESCRIPTION OF THE PREFERRED EMBODIMENTS OF THE PRESENT INVENTION

Figure 3:
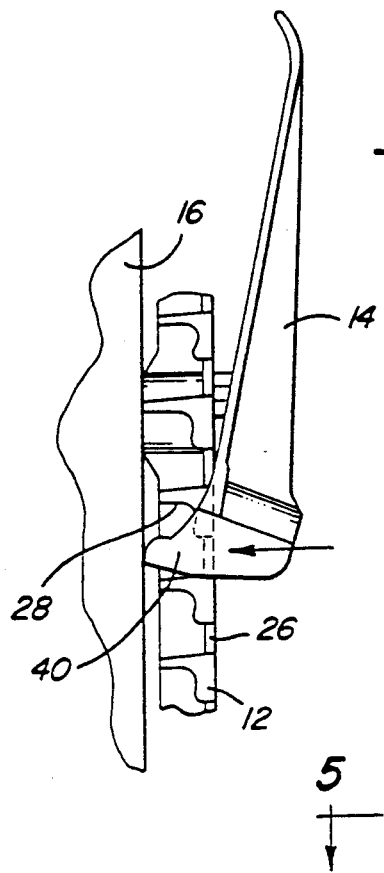
FIG. 3 discloses a side elevational view of the bracket as it has been slide into the support structure.

The drawing discloses the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring to FIG. 1, a support system according to the present invention is shown, generally indicated as 10. The support system comprises at least one vertically provided support structure 12 and at least one bracket 14.

As illustrated according to the present invention, the structure 12 is fitted in place against a wall 16. Two of the structures 12 are shown and, as may be seen, the structures are fitted to the wall 16 by means of a plurality of fasteners 18.

As illustrated, the present invention 10 is in place to hold one or more tubes or conduits 20. The tubes or conduits 20 are shown as being of a relatively small diameter, but, of course, a variety of differently sized tubes or conduits may be supported.

Of course, the conduits 20 may be substituted by shelves and the like which may be used to support such things as corrosive or radioactive materials or any material requiring support that would be best supported by a non-metallic, non-conductive and corrosion-resistant support structure.

With reference now to FIG. 2, a detailed view of a portion of the structure 12 and the bracket 14 is illustrated With reference first to the structure 12, the structure 12 comprises a front bracket supporting face 22 defined on the front most region of a central rib 24. At each side of the rib 24 there is provided a plurality of bracket receiving slots 26. The slots 26 allow for the bypassage of protruding structures of the bracket 14 to pass thereby.

Also provided to each side of the rib 24 is a bracket finger receiving slot 28. It is in the finger receiving slot 28 that the bracket 14 is securely mounted.

Defined through the rib 24 is a fastener receiving aperture 30 which is provided for the interattachment of fasteners as may be necessary.

Preferably, the structure 12 is composed of a polymerized material to thereby provide maximum non-conductivity of any electrical charge which may be received from any one of the conduits 20.

The finger receiving slots 28 are defined as being slots having arcuate inner walls. However, slots of other possible shapes including flat walls and the like may be used as preferred.

With reference specifically to the bracket 14, the bracket comprises a conduit receiving portion 32 and an interlocking portion 34. The conduit receiving portion 32 is illustrated as having a substantially planar upper face 36 thus enabling the bracket 14 to be used for a variety of applications. However, it should be understood that the upper face 36 may be fine tuned to be applicable to more particular applications such as holding conduits in a spaced apart manner, whereby the upper face would have an irregular surface which defines slots or channels therein to allow for the placement of conduits thereon to keep them from shifting or contacting one another. FIG. 7 illustrates a plurality of side-by-side conduit channels 37 defining the upper face 36.

Referring still to FIG. 2, at the farthest end of the conduit receiving portion 32 is provided an upwardly turned conduit holding lip 38. This lip prevents the movement or slippage of a conduit off of the bracket 14.

The interlocking portion 34 includes a pair of spaced apart finger segments 40. The finger segments 40 define a U-shaped channel at the end of the interlocking portion 34. As illustrated, the finger segments 40 have at their end most points a pair of opposingly facing studs 42. The studs 42 define an arcuate shape for coaction with the finger receiving slot 28 of the structure 12. However, like the finger receiving slots 28, this arcuate shape may be altered to provide an alternate shape which functions in the interlocking of the bracket 14 to the structure 12. The advantage achieved by the close interlocking of the fingers 40 with the slots 28 is that the shape of the studs 42 must substantially coact with the interior wall defined in the slots 28.

As discussed above, the bracket 14 is preferably composed of a polymerized material. This composition allows for the achievement of one of the primary purposes of the invention, that being the non-conductivity of energy discharged from the conduits 20 supported by the bracket 14.

Referring now to FIG. 3, an elevated side view of the bracket and its corresponding support structure 12 is illustrated. FIG. 3 (and FIG. 4) is useful in that it illustrates how the bracket 14 is inserted into the structure for interlocking therewith.

According to the disposition of the bracket 14 with respect to the structure 12 as illustrated by FIG. 3, the axis of the bracket 14 is positioned in a substantially aligned position relative to the axis of the structure 12. With this position achieved, the interlocking portion 40 of the bracket 14 is inserted by the slots 26. Once fully inserted, the bracket is pivoted to a perpendicular position relative to the structure 12 as illustrated in FIG. 4.

Figure 4:
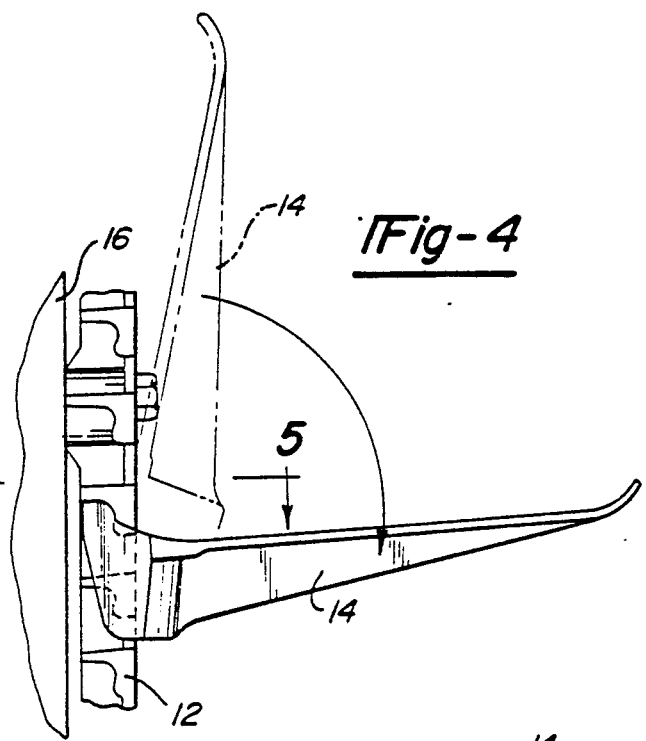
FIG. 4 illustrates substantially the same view as FIG. 3 excepting that the support bracket has been shifted into its locked position.

With reference to FIG. 4, the interlocking portion 40 has been successfully and fully interlocked with the slots 28. The channel defined by the interlocking fingers 40 is then in a position to abut the face 22 of the structure 12 thus preventing the bracket 14 from being lowered further than the position illustrated in FIG. 4.

Figure 5:
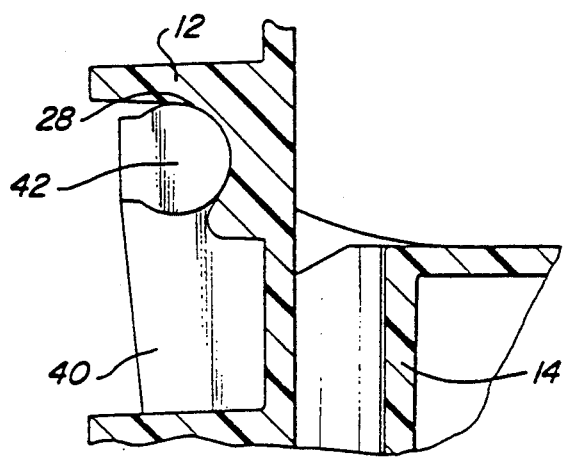
FIG. 5 discloses a detailed view of the locking arrangement shown in the view taken along line 5—5 of FIG. 4.

With respect to FIG. 5, a cross-sectional view of the interlocked relationship of a segment of the bracket 14 with respect to the structure 12 is illustrated in detail. As can be seen, the studs 42 are firmly interlocked with the slot 28. This corelation provides a very firm hold for the bracket with respect to the structure 12.

Figure 6:
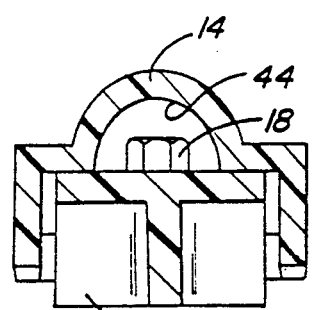
FIG. 6 shows a cross-sectional view of the bracket interlocked with the support structure.

Referring to FIG. 6, a cross section of the bracket 14 in its locked position against structure 12 is illustrated. This view illustrates a fastener channel 44 defined on the inner wall of the bracket 14. The channel 44 accomodates the head of the fastener 18.

Having described my invention, however, many modifications thereto will become apparent to those skilled in the art to which it pertains without deviation from the spirit of the invention as defined by the scope of the appended claims.

I claim:

1. A support system for supporting one or more electrical conduits, said support system comprising:
   a substantially uprightly positionable, non-conductive support structure having a top end and a bottom end; and
   at least one non-conductive bracket removably interlockable with said support structure;
   said at least one bracket including a conduit support portion and an interlocking portion;
   said interlocking portion defining a male locking portion, said male locking portion including two spaced apart and facing cantilevered finger segments;
   said support structure comprising a central rib having a first side, a second side, a front said and a back side;
   said first side and said second side having defined thereon a plurality of locking slots for interattachment with said male locking portion;
   each of said locking slots being defined by an arcuate wall, said arcuate wall including a lower end region, said end region defining a rearwardly extending flange at a lower end of said locking slot;
   said first and second sides further having defined thereon a plurality of finger segment bypassing slots, said locking slots and said bypassing slots being arranged so that one locking slot is situated immediately above each bypassing slot;
   whereby with said conduit support portion extending in a substantially vertical direction, said finger segments of said arm are insertable through said bypassing slots upon initial interlocking of said bracket with said structure and thereafter, upon rotation of said conduit support portion to a substantially horizontal orientation, said finger segments engage said locking slots and are supported by said flanges so that the interaction between said finger segments and said slots locks said bracket to said structure against horizontal and vertical movement.

2. The support system of claim 1 wherein said finger members are substantially cylindrically shaped.

3. The support system of claim 1 wherein a top side of said bracket is substantially smooth.

4. The support system of claim 1 wherein a top side of said bracket defines a plurality of conduit-receiving channels.

5. The support system of claim 1 wherein said support structure defines a central support rib having a bracket receiving face;
   said bracket includes a support rib receiving recession defined between said fingers;
   said face and said recession being coactable with one another when said bracket is in place on said support structure.

6. The support system of claim 5 wherein said support structure includes at least a pair of finger-passing recesses having curved walls defined on each of said first and second sides, said recesses being defined below said finger receiving slots.

* * * * *